(12) United States Patent
Fanton et al.

(10) Patent No.: US 9,452,947 B2
(45) Date of Patent: Sep. 27, 2016

(54) FURNACE HAVING A THERMAL BARRIER

(75) Inventors: Xavier Fanton, Aulnay sous Bois (FR); Christophe Delforge, Chevincourt (FR); Christophe Machura, Chevincourt (FR); Stephane Berard, Mouy (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 802 days.

(21) Appl. No.: 13/257,798

(22) PCT Filed: Apr. 6, 2010

(86) PCT No.: PCT/FR2010/050653
§ 371 (c)(1),
(2), (4) Date: Nov. 23, 2011

(87) PCT Pub. No.: WO2010/116082
PCT Pub. Date: Oct. 14, 2010

(65) Prior Publication Data
US 2013/0139553 A1     Jun. 6, 2013

(30) Foreign Application Priority Data

Apr. 8, 2009 (FR) .................................. 09 52306

(51) Int. Cl.
  *C03B 23/025* (2006.01)
  *C03B 29/08* (2006.01)
  *F27D 99/00* (2010.01)
(52) U.S. Cl.
  CPC ......... *C03B 23/025* (2013.01); *C03B 23/0258* (2013.01); *C03B 29/08* (2013.01); *F27D 99/0006* (2013.01); *Y02P 40/57* (2015.11)

(58) Field of Classification Search
None
See application file for complete search history.

(56) References Cited

U.S. PATENT DOCUMENTS

| | | | | |
|---|---|---|---|---|
| 1,400,859 | A * | 12/1921 | Brown | F24C 15/22 392/425 |
| 3,490,405 | A * | 1/1970 | Reader et al. | 72/60 |
| 3,852,517 | A * | 12/1974 | Fava | 174/84 R |
| 3,957,479 | A * | 5/1976 | McMaster et al. | 65/350 |
| 4,097,353 | A * | 6/1978 | Kishida et al. | 204/410 |
| 4,894,517 | A * | 1/1990 | Oguri | 219/388 |
| 5,656,052 | A * | 8/1997 | Boardman et al. | 65/103 |

(Continued)

FOREIGN PATENT DOCUMENTS

| | | |
|---|---|---|
| CH | 625 629 | 9/1981 |
| JP | 60 38534 | 2/1985 |

(Continued)

OTHER PUBLICATIONS

JP2000-139727 Machine Translation, performed May 13, 2014 JPO website.*

(Continued)

*Primary Examiner* — Lisa Herring
(74) *Attorney, Agent, or Firm* — Oblon, McClelland, Maier & Neustadt, L.L.P.

(57) ABSTRACT

A furnace for heating an object in a space, including a refractory ceramic wall, a heat source, at least one metal plate coated with an adherent layer of ceramic material on one of its principal faces, the coated plate being placed between the wall and the source, the adherent layer being situated facing the source. The coated metal plate acts as a thermal barrier and improves heating efficiency of the heat source. The furnace may for example serve to bend by gravity glass sheets placed on a bending frame.

28 Claims, 3 Drawing Sheets

(56) References Cited

U.S. PATENT DOCUMENTS

Figure 1:
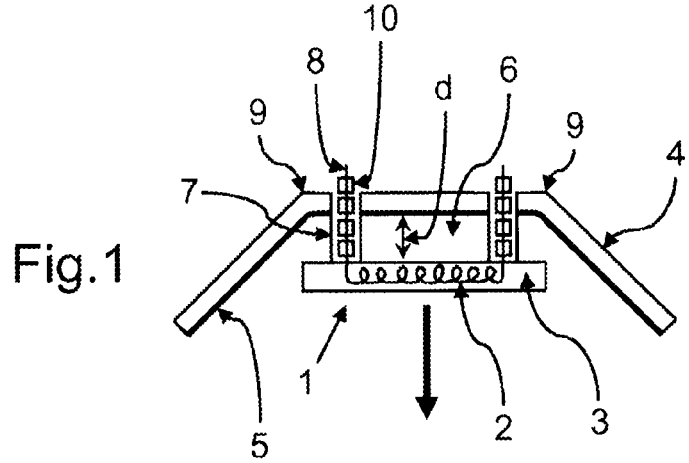

| | | |
|---|---|---|
| 2005/0034850 A1* | 2/2005 | Yoshimura et al. .......... 165/276 |
| 2005/0103056 A1* | 5/2005 | Fotheringham et al. ....... 65/162 |
| 2005/0199010 A1* | 9/2005 | Maeda ......................... 65/29.19 |
| 2008/0134721 A1 | 6/2008 | Maeda |
| 2008/0141867 A1* | 6/2008 | Cavada et al. ................. 99/332 |
| 2009/0197215 A1 | 8/2009 | Balduin et al. |

FOREIGN PATENT DOCUMENTS

| | | | |
|---|---|---|---|
| JP | 62-77891 | | 5/1987 |
| JP | 04-281187 | | 10/1992 |
| JP | 2000139727 A | * | 5/2000 |
| JP | 2002-43037 | | 2/2002 |
| JP | 2005-072442 | | 3/2005 |
| JP | 2008241194 A | * | 10/2008 |

OTHER PUBLICATIONS

JP2008-241194 English Translation Performed by Schreiber Translations, Inc. May 2014.*

English Translation of JP2000-139727, Translated by FLS, Inc., May 2014.*

Watlow, "Radiant Heating with Infrared A Technical Guide to Understanding and Applying Infrared Heaters", Watlow Electric Manufacturing Company, pp. 1-37, available Oct. 26, 2010.*

French Search Report Issued Nov. 12, 2009 in French Patent Application No. 0952306 filed Apr. 8, 2009.

International Search Report Issued Jul. 15, 2010 in PCT/FR10/050653 filed Apr. 6, 2010.

* cited by examiner

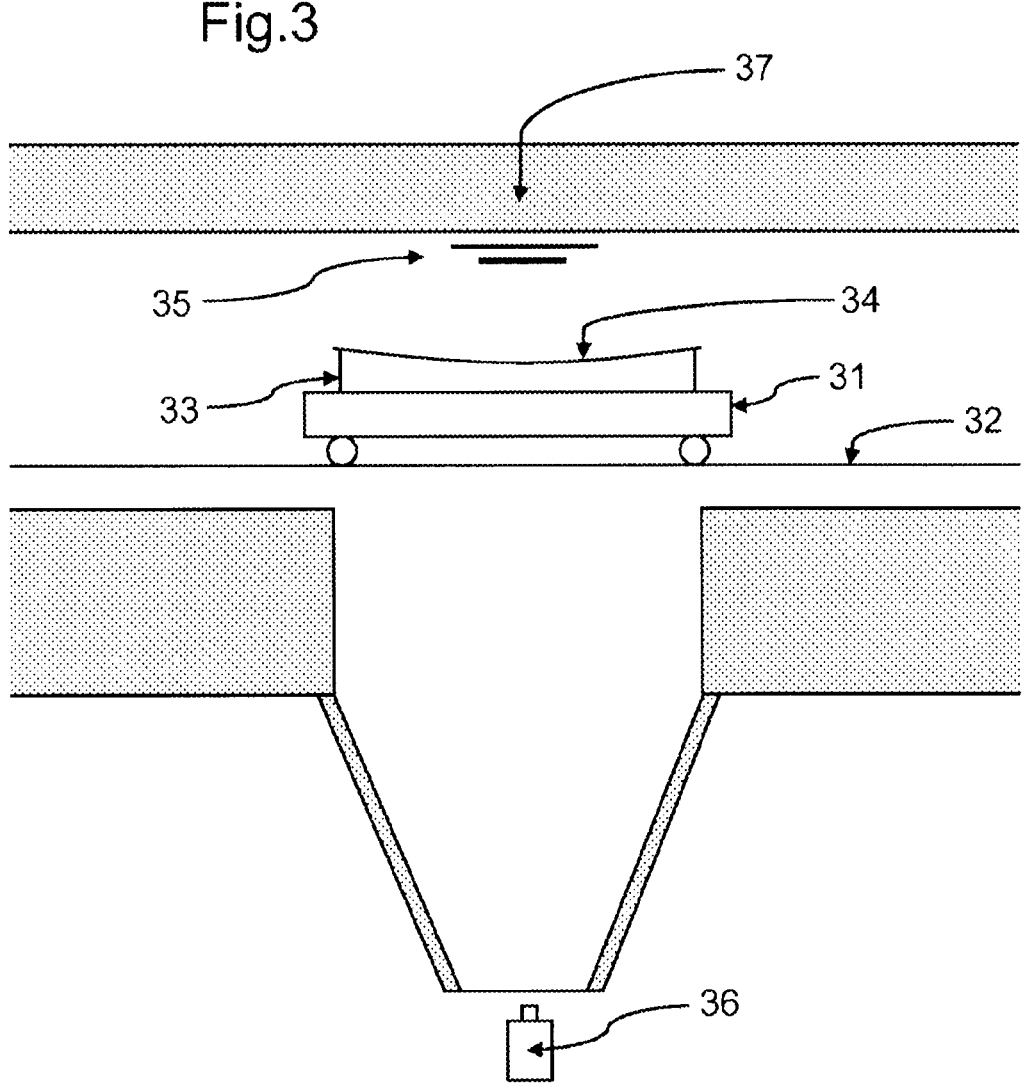

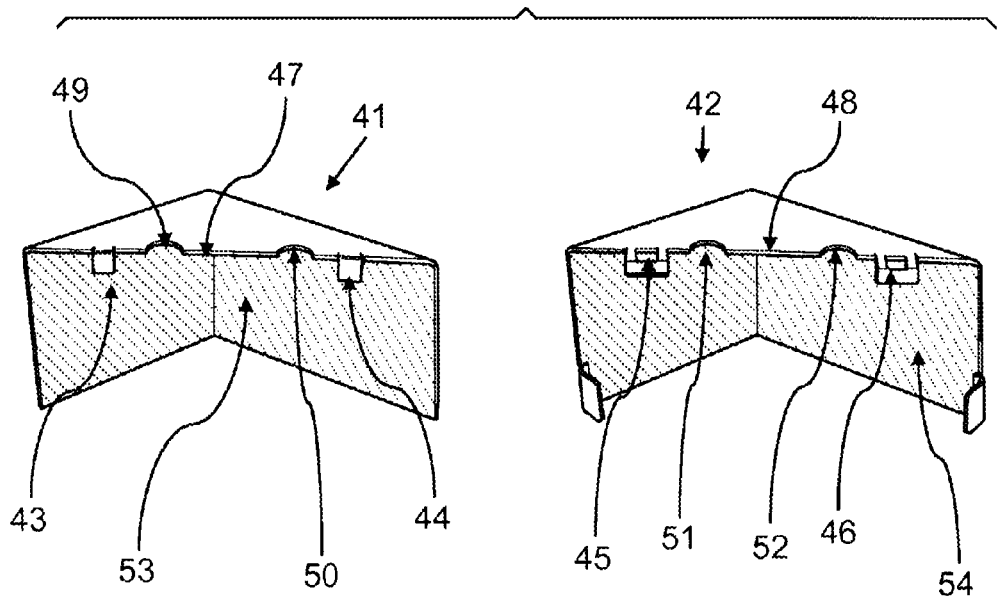
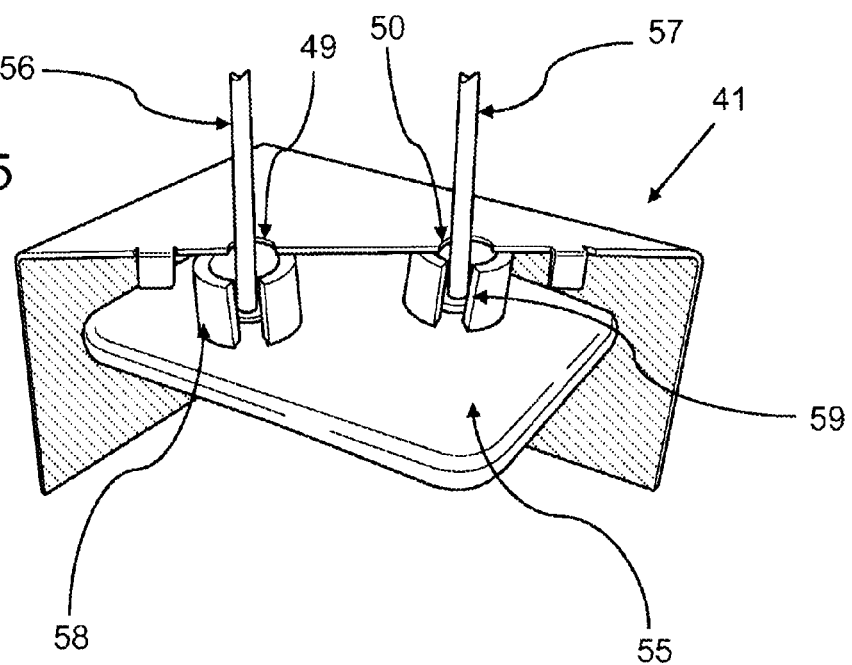

FURNACE HAVING A THERMAL BARRIER

The invention relates to a furnace having a thermal barrier capable of directing heat in a desired direction toward an object to be heated.

Furnaces contain at least one heat source designed to heat an object. The heat source naturally has the tendency to heat in all directions. Even if the heat returns indirectly toward the object to be heated by reflection or by radiation from the walls of the device, a large part of the heat produced is of necessity lost by not concentrating all the heat produced to the object to be heated. This problem is presented in any type of heating device in general and notably in glass heating furnaces. There is also a desire to improve the heating rate and if possible to reduce operating temperatures without reducing efficiency. Improvements provided to the device should not be accompanied by disadvantages such as a reduction in the working volume or a deterioration in the production quality. In particular, with the aim of energy saving, it is desired to improve the heat yield of furnaces for bending glass sheets by gravity.

Furnaces have a heating source that may be a flame or an electrical resistance. In the case where glass sheets passing through a tunnel furnace are heated with a view to bending them, mention may be made of WO2007138214 and WO2006095007 that teach the use of electrical resistances placed in the roof of the furnace. These resistances are placed between the refractory brickwork of the furnace and the object to be heated (glass sheets conveyed on trolleys). Nothing in particular has been provided for directing radiation from resistances to the glass, so that it is essentially the wall of the furnace that fulfills this role to a certain extent.

GB 2 201 670 teaches ceramic reflecting elements of the aluminosilicate type placed after the glass relative to the heating elements, so as to redirect radiation to the glass.

EP 0 659 697 teaches reflecting screens placed vertically for limiting the spread of radiation. These elements may be raised or lowered. They consist of Fiberfrax fibers (aluminosilicates) or silica, SiC, $Si_3N_4$ composites or steel associated with a fibrous aluminosilicate of the Fiberfrax type. Panels of the Fiberfrax type are easy to cut before they are installed but they become brittle and friable after they are first heated. Moreover, they emit fumes when first heated (disappearance of organic binders). The method for fixing Fiberfrax to steel is not mentioned. No screen is placed behind the heat source.

U.S. Pat. No. 7,331,198 describes the association of a heating element with a ceramic plate and a plate for equalizing temperatures. The ceramic plate is situated behind the electrical heating wire relative to the glass and the equalizing plate is situated between the heating wire and the glass. The ceramic plate serves as a support for the heating wire. The equalizing plate serves to equalize the temperature of the radiation. It forms a radiating screen.

EP 0 133 847 teaches heating with quartz tubes and a wall made of aluminoceramic close to the infrared emitting tube.

US2005/034850 teaches a reflector situated between the wall of a furnace and an object to be heated. The reflector may be made of metal and may be coated with a ceramic, but so that this is not directed toward the object to be heated.

JP60038534 teaches a reflector used between 200 and 400° C., comprising a film containing an oxide on a metal. This reflector has low emissivity (below 0.4-0.5) for wavelengths less than 4-5 µm and high emissivity (greater than 0.85-0.90) for wavelengths greater than 4-5 µm. The infrared radiation obtained produces an agreeable heating effect for the human body that is more sensitive to wavelengths greater than 4 µm. Deterioration of the film by heat is prevented by virtue of the use of a paint as a binder containing a polymer, NiC and SiC, said paint being resistant to temperatures of the order of 300° C. At 300° C. an ordinary stainless metal is stable from the point of view of its emissivity.

For glass to be bent, it has to be heated to a temperature between 500° C. and 800° C. In order to give glass this temperature, it is necessary for the heating system to be at least 200° C. hotter than the temperature aimed at for the glass. This means that the wavelength of the emission peak of the heating system will of necessity be less than 3.1 µm (wavelength corresponding to a temperature of 700° C.) and even rather less than approximately 2.8 µm (wavelength corresponding to a temperature of 800° C.). According to the present invention, an attempt is made to direct radiation from electrical resistances to the object to be heated.

In order to direct radiation from electrical resistances to an object as much as possible, the inventors first of all considered placing a ceramic plate of the Monalite type or a steel plate of the 316Ti type behind these resistances to act as a heat barrier. These two materials are in point of fact capable of returning thermal radiation well by reason of their high reflectivity. However, a very small influence on the efficiency of heating was observed. Moreover, the ceramic plate had the tendency to crumble and particles that had escaped from it were found on objects to be heated. It was also observed that even though the metal plate withstood test temperatures (of the order of 650° C.) very well, its surface had the tendency to become dull and to become rough under the effect of surface oxidation.

The use of friable materials that are standard in the field of refractories for furnaces, is problematic since the particles that are detached therefrom may contaminate objects to be heated and present health problems for persons assigned to operating them.

It has now been found that a combination of a ceramic material and a metallic material may provide a significant improvement in heating efficiency. The metallic material provides the support with solidity and cohesion as well as ease of machining and shaping, while the ceramic material provides high reflectivity and thermal stability. This association makes it possible moreover to use the technology of flame spray deposition that leads to a ceramic coating of high integrity that does not crumble and adheres well to the substrate. Another advantage of the composite barrier according to the invention is its thinness if it is compared with monolithic ceramic plates, which frees an appreciable space in a furnace. This low mass also results in low thermal inertia, which is advantageous in temperature change phases.

Thus, the invention relates to a furnace for heating an object in a space comprising a wall made of refractory ceramic and a heat source, having at least one metal plate coated with an adherent layer of ceramic material on one of its principal faces placed between said wall and said source, the adherent layer being situated facing the source.

The object may notably comprise or be a glass sheet. Notably, the glass sheet may be disposed on a gravity bending mold, it being possible for said mold to be of the frame type, notably of the skeleton type. After gravity bending, bending may be finished by a step of press bending.

The plate is made of a metal that withstands the temperatures used. In the case of a furnace for bending glass sheets, a steel may be used such as a stainless steel of the austenitic, ferritic or martensitic steel type such as 316Ti, 304L, 316L, 441 or NS30, a metal or alloy of a refractory metal such as nickel, notably an Inconel. The uncoated metal plate generally has a thickness extending from 0.5 to 5 mm.

The adherent layer consists of an inorganic material that is a ceramic. The ceramic adheres to the surface of the metal plate, as the case may be via an intermediate tie layer, as a consequence of its deposition method that is either plasma spray or thermal spray deposition or electron beam evaporation (or e-beam evaporation). This good adhesion relies in part on interdiffusion of chemical elements from the substrate to the coating and vice versa. The coating is particularly adherent and strong on the metal plate and withstands well the thermal shock generated by stopping the device and bringing it up again to temperature. This adhesion is generally at least 10 MPa. The Vickers hardness is generally above 500 Hv0.3 and more generally between 600 and 900 Hv0.3. The ceramic of the layer, at least at its free surface, preferably has high total reflection of infrared, notably greater than 30% between 2 μm and 5 μm. Thus, the material of the layer reflects infrared more than ceramic of the wall does. Its surface, that is to say its free surface (not coated with another material), or even its entire mass may comprise or be based on alumina or zirconia, notably zirconia doped with yttrium or calcium or magnesium. The expression "based on" means that the material contains more than 50% by weight for example of zirconia or doped zirconia. Zirconia is a preferred material, notably on account of its high coefficient of thermal expansion which enables it to follow deformation of the metal substrate very well under the effect of temperature changes. The ceramic preferably has a thickness between 20 μm and 3 mm. The surface of the ceramic may be polished manually or with the aid of a mechanical surface grinder so as to increase infrared reflection or so as to make this more directional. In the case of deposition of the ceramic by flame spraying, it is recommended first of all to deposit a tie layer on the metal substrate, notably of the Ni—Cr—Al alloy type, called "Nicral". This tie layer generally has a thickness between 10 μm and 500 μm. It is considered that this tie layer does not form part of the "ceramic material layer". The tie layer may be deposited by any suitable method, notably by plasma spray or by electron beam evaporation or by PVD. In practice, it is simpler to deposit the tie layer and the ceramic by the same method, in particular by plasma spray.

The heat source may be any source that may notably be found in a furnace, such as a flame or an electrical resistance. It may consist of an electrical resistance known as a "coiled resistance" composed of a metal wire rolled around a tube composed of a ceramic material. The heat source may also be a ceramic infrared radiator or a ceramic infrared heater. A ceramic infrared radiator is a ceramic block containing an electrical resistance. The ceramic of the ceramic infrared radiator serves to hold and protect the electrical resistance. The electrical resistance in the ceramic infrared radiator may be a spiral resistance, in the form of a spiral spring, or undulating in a plane.

The coated metal plate is placed between the wall of the furnace and the heat source. This means in particular that a normal exists to the wall passing through said coated plate and then through said source when leaving the wall. This normal then passes through the space provided for heating the object and thus, as the case may be, the object itself. The normal does not encounter any solid element between the wall and the plate when leaving the wall. The normal does not encounter any solid element between the heat source and the location of the object and even the object, when leaving the heat source.

The plate may have orifices, notably with the aim of fixing it to the wall of the furnace and for the passage of electrical connections or with the aim of securing it to the source or for allowing direct aim with an optical temperature measuring apparatus (pyrometer).

Preferably, a space is left between the coated plate and the heat source. This space, filled with ambient air, constitutes an insulating air cushion. It is possible to secure the plate and the heat source together when the latter is solid, notably in the case of a ceramic infrared radiator, via a system of spacers. In this way, preferably, a "first" free space is created between a "first" side of the source and the coated plate with a distance from 2 mm to 100 mm and preferably from 10 mm to 60 mm. This first free space corresponds to that situated on the back of the source relative to the object to be heated.

The heat source may be surrounded by an assembly of plates according to the invention except on one side (the side referred to as "open"), so that heat is better channeled in the direction of the open side corresponding to the desired heating direction. This configuration makes it possible better to confine any air cushion present between the heat source and the plate. In this case, the first free space between the first side of the source and the coated plate presents the distance already given (2 mm to 100 mm and preferably 10 mm to 60 mm), the other free spaces between the plate and the source on the other non-open sides being generally less than said free space, notably less than 8 mm.

Preferably the metal plate is coated with a ceramic material on its two principal faces.

The furnace according to the invention may notably be a tunnel furnace. In particular, the object to be heated may be move within the tunnel furnace.

The source and the coated plate (placed between the wall of the furnace and the source) form a module. Notably, the source and the plate may be secured together, for example by a system of spacers. The furnace according to the invention may comprise a plurality of such modules juxtaposed. These modules may be supplied independently to each other so as to take account of the position of the object to be heated and the shape of the object to be heated. If the object moves within the furnace, as in a tunnel furnace, it is possible to control the supply to the source (notably the electrical supply when electrical resistances are to be supplied) according to the position of the object in the furnace.

The plate according to the invention is at least placed between the source and the wall of the furnace. It may also additionally, by virtue of a particular form that it is given, surround the source, at least partially, on its lateral sides so as to direct lateral radiation toward the location of the object to be heated. This particular form may be given to the plate (before the ceramic coating is applied) by pressing, folding or assembling, notably be welding various pieces of plates. The plate, within the meaning of the invention, may also be an assembly of plates of which one is "the bottom" between the source and the wall, and the others are "lateral", that is to say situated around the source. A free space is of course retained that is situated between the source and the location of the object to be heated.

The sides or lateral walls generally leave a thermal imprint on the glass (resulting from the absence of the object between them and the glass). This imprint is visible by polariscopy. According to this technique, a polarizing filter (that is placed on a light path for the polarizer) is placed between a light source and glass made according to the invention (with sides or lateral walls) and a second polarizing filter is placed between the glass and the observer. The direction of polarization of the second filter is at 90° relative to the direction of polarization of the first filter. If the sides or lateral walls have been used, contrast lines then appear in the zone of the treated glass. These lines are in fact a mark resulting from the colder temperature of these walls.

Thus, the module may for example comprise a heat source (notably of the electrical resistance or ceramic infrared radiator type and lateral plates (disposed perpendicularly to the wall of the furnace) and a bottom plate placed between the source and the wall of the furnace), each of the plates being according to the invention, that is to say metallic and coated with an adherent layer of a ceramic material. The lateral plates may for example be four in number. The coating is situated on the principal face of the plate facing the source. A coating of the same nature may also be placed on the other principal face of the plate. It is notably possible to have a combination according to which the lateral plates are covered only on one face and the bottom plate is covered only on one face. It is also possible to have a combination according to which the lateral plates are covered only on one face and the bottom plate is covered on its two faces. It is also possible to have a combination according to which the lateral plates are covered on their two faces and the bottom plate is covered only on one face. It is also possible to have a combination according to which the lateral plates are covered on their two faces and the bottom plate is covered on its two faces.

In the case of juxtaposed modules, it is generally possible to have lateral plates serving at the same time as two juxtaposed modules, in which case they are coated with ceramic on their two faces.

The invention also relates to the use in a general manner of a metal plate coated with an adherent layer (notably deposited by plasma spray) of a ceramic material on one of its principal faces in order to direct thermal radiation.

The invention also relates to a heating device comprising a heat source, a metal plate coated with an adherent layer of a ceramic material on one of its principal faces, the adherent layer being situated facing the source, said plate surrounding said heat source, at least one fixing rod connected to the heat source passing through said plate, said plate being in several parts and being assembled around said fixing rod by at least one orifice, the perimeter of said orifice belonging to various parts of said plate. Such a device (or module) is particularly useful for directing heat radiation to the object to be heated. The expression "surround the heat source" means that this source is entirely included in the volume delimited by the inner surfaces of the metal plate, as is moreover the case of the devices of FIGS. 1 and 2 described hereinafter. The device is in several parts assembled so as to be easily mounted and demounted and also so as to be mounted on a furnace that was at the beginning not provided to receive it. The assembly of various parts of the plate may be made by a groove and tongue system or any other mechanical system, for example of the nut and bolt type. The metal plate has at least one orifice, generally two, for the passage of at least one rod for fixing to the wall (this term should be taken in its widest sense: roof, hearth, lateral wall etc) of the furnace. This orifice is shared between various parts of the metal plate so that it is only formed when the device is assembled. This makes it possible to mount or demount the metal plate without having to touch the rod since the orifice is made or unmade around the latter. Thus, when the plate is disassembled, it will be seen that the perimeter (or contour) of the orifice is shared between various parts. The fixing rods serve as an electrical conductor for supplying the source. In this case they may be two in number. Thus, the invention also relates to a heating device comprising a heat source, a metal plate coated with an adherent layer of a ceramic material on one of its principal faces, said plate surrounding said heat source, at least one fixing rod connected to the heat source passing through said plate, said plate being in several parts assembled around said fixing rod by at least one orifice, the perimeter of said orifice belonging to several parts of said plate. The adherent layer is placed on the side of the plate facing the source. Notably, the heat source may be electrical, at least two fixing rods being connected to the heat source and passing through the plate (in the assembled state), the at least two rods conducting electricity consumed by the heat source.

The invention also relates to a method for heating an object, provided by the furnace or the device according to the invention. Heating may notably serve to bend a glass sheet by gravity placed on a bending frame. Notably, in this application, the coated metal plate is generally at a temperature of between 700 and 1000° C.

As examples, the efficiency of the composite barrier according to the invention was compared with a Monalite (aluminosilicate) plate with a thickness equal to 20 mm on the one hand and, on the other hand, an uncoated 316 steel plate with a thickness equal to 2 mm, all geometries being moreover equal. The source was a ceramic infrared radiator placed opposite a glass sheet. The thermal barrier according to the invention comprised a 316Ti stainless plate and a coating of zirconia situated on the side of the ceramic infrared radiator. The measuring device was that of FIG. 3. The furnace had means for heating the surroundings (coiled resistances) at 600° C. and a ceramic infrared radiator. Screens were placed between the coiled resistance and the glass so as to prevent direct radiation. In this way, the glass was subjected only to direct radiation from the ceramic infrared radiator.

The distance between the glass and the ceramic infrared radiator was 100 mm. The distance between the plate and the ceramic infrared radiator was 20 mm. The ceramic infrared radiator was supplied with 1200 watts of electrical power. The temperature of the heated glass sheet was measured when thermal equilibrium was reached. Table 1 gives the results.

TABLE 1

| Nature of the plate | Temperature at equilibrium |
| --- | --- |
| Absence of plate (comparative) | 656° C. |
| 316Ti stainless steel (comparative) | 660° C. |
| Monalite ceramic (comparative) | 654° C. |
| 316Ti stainless steel coated with zirconia | 664.5° C. |

FIG. 1 shows an integral assembly comprising a source and a barrier according to the invention. The source is a ceramic infrared radiator 1 comprising an electrical resistance 2 in a ceramic matrix 3. The thermal barrier comprises a plate 4 made of 316Ti stainless steel and the face of this plate directed toward the ceramic infrared radiator is coated with a layer 5 of zirconia deposited by plasma spray. A certain free space is maintained between the ceramic infrared radiator and the plate in order to constitute an insulating air gap 6 between the ceramic infrared radiator and the coated plate. Spacers 7 provide the distance d (or free space) between the plate and the ceramic infrared radiator and also secure these two components together. The two electrical wires 8 in contact with the resistance inside the ceramic infrared radiator pass through orifices provided in the plate (these orifices are drilled in the metal before the ceramic layer is deposited). These electrical wires are electrically insulated by small juxtaposed ceramic cylinders 10 leaving said wires flexible. The metal plate initially consists of several pieces assembled together by welds 9. They comprise a "bottom" part situated between the source and the furnace wall and lateral parts situated around the ceramic infrared radiator. This configuration makes it possible to constitute a sort of deflecting barrier surrounding the source except on a said open side in the direction shown by the thick arrow that corresponds to the direction in which the heating power is to be directed. The thicknesses of the components are not to scale for reasons of clarity.

Figure 2:
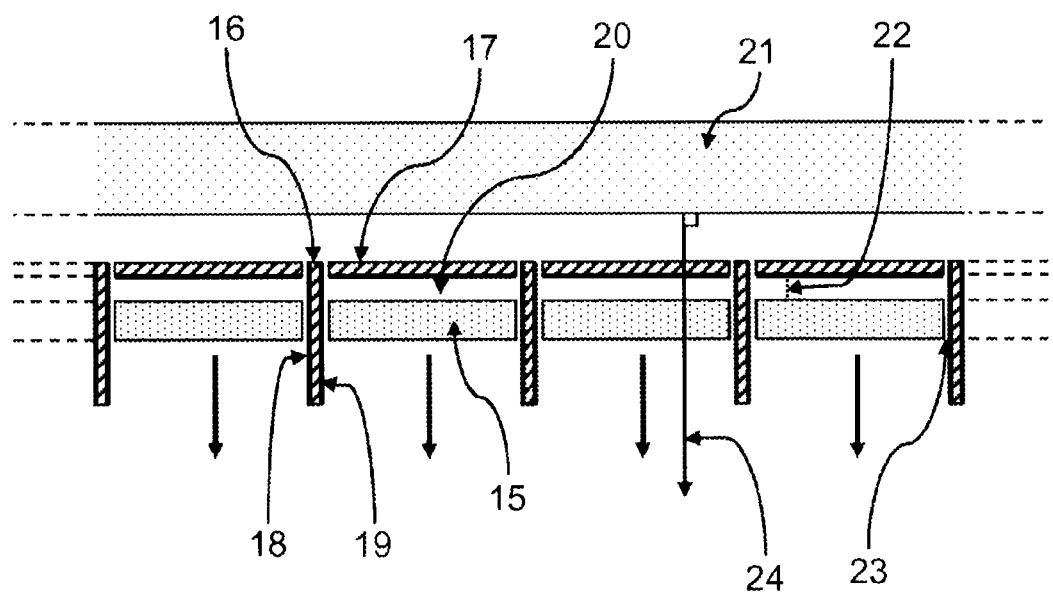

FIG. 2 shows a multiplicity of juxtaposed source/barrier assemblies according to the invention, which are able notably to line the roof or walls or hearth of the furnace, that is to say in a general manner a "wall" in refractory ceramic. This device is placed as a cladding for the wall 21 in refractory ceramic. It consists of a modulatable system that is easy to mount or demount. Each of these assemblies comprises a ceramic infrared radiator heat source 15 (the resistance or the electrical wires leaving the ceramic infrared radiator and then the plate have not been shown) surrounded by five metal plates: four lateral metal plates 16 (in FIG. 2 only two are shown around each ceramic infrared radiator) and a bottom plate 17. The lateral plates act as two juxtaposed modules. In the case shown, each plate is covered on its two principal faces 18 and 19 with ceramic deposited by plasma spray. In the case shown, the bottom plate 17 is only covered on the side facing the ceramic infrared radiator. The double-face coating of the lateral plates 16 insulates each ceramic infrared radiator better relative to its neighbors, which makes it possible to individualize the temperatures of each module better according to its position relative to the object to be heated. The assembly of the system thus gains in flexibility and it is possible to give a different power to the various juxtaposed modules. It will thus be seen that the various plates surround the heat sources except on the side known as the "open" side in the direction indicated by the downward arrows, the desired heating direction. This surrounding of the sources, made quite tightly on the lateral sides (non-open sides), creates a relatively confined air cushion that contributes to the insulation at the back of the ceramic infrared radiator (also the uncovered side). It is thus possible to distinguish between a "first" free space 22 between a "first" side of the source and the coated plate at the back of the ceramic infrared radiator (which extends from 2 mm to 100 mm and preferably from 10 mm to 60 mm), the other free spaces 23 between the plate and the source on the other non-open sides being less than said first free space (notable less than 8 mm). It will moreover be seen that a normal 24 to the wall 21 exists passing through a plate and then through the source when leaving the wall 21, the space between said plate and the wall being free.

FIG. 3 shows the device with which the efficiency of a ceramic infrared radiator/barrier module according to the invention was determined. It consists of a tunnel furnace inside which trolleys 31 may move along rails 32. Each trolley conveys a bending frame 33 of which a 2 mm thick glass sheet 34 is positioned. The trolley shown is placed under a ceramic infrared radiator/barrier module 35 consisting of a ceramic infrared radiator and a plate situated between the ceramic infrared radiator and the refractory ceramic wall 37 of the furnace. This module is placed under the roof of the furnace that acts as refractory ceramic wall of the furnace. The temperature of glass is measured by a pyrometer 36 through an orifice provided in the hearth of the furnace, and through the trolley. Measurements were taken at thermal equilibrium and with the trolley 31 stationary.

FIG. 4 shows a metal plate according to the invention in two parts 41 and 42 that can be assembled about a heat source. These plates were made from flat steel sheet that was cut out, folded and welded. The inside 53 and 54 of these parts of a plate are coated with zirconia by plasma spray. These two parts 41 and 42 are assembled by inserting the tongues 43 and 44 in the slots 45 and 46. On assembly, the edges 47 and 48 are juxtaposed. These edges 47 and 48 comprise parts of orifices (49,50) and (51,52) designed to form two circular orifices when the plate is assembled. These two orifices serve to allow two fixing rods to pass for connecting the heat source to the refractory wall of the furnace.

FIG. 5 shows the part 41 of the plate of FIG. 4, mounted around a heat source 55 of the radiant ceramic panel type. This source holds to the wall of the furnace by means of two rods 56 and 57. The part 42 of FIG. 4 has only to be placed facing the part 41 (FIG. 4) in order to assemble the plate around the source 55. The parts of the orifice (49,50) are then completed by the parts of the orifice (51,52) to form two circular orifices about the fixing rods. Such a device is particularly suitable for being fixed to the roof of the furnace, the fixing rods (56,57) then being vertical. These rods hold the heat source 55 and the heat source holds the metal plate (41,42). Spacers 58 and 59 made of sintered alumina provide a certain distance between the source 55 and the plate (41,42). These spacers are split tubes that may be positioned around the rods by virtue of their slots. These spaces ensure the presence of an insulating air cushion between the source 55 and the side of the plate having orifices for rods. The rods may act as an electrical supply for the source 55. In this case, with the aim of electrical insulation, two other small ceramic tubes are provided that are equally slit in order to surround the rods at the place where these pass through the plate, these small tubes being placed inside the spacers 58 and 59. The inner surface of the assembled plate determines the form of a parallepiped entirely containing the source 55. The plate thus surrounds the source completely. This plate (in two parts) comprises four lateral sides and a base. It has an "open" side for directing heat downward.

The invention claimed is:

1. A furnace for heating a glass sheet in a space and bending the glass sheet by gravity comprising:
    a refractory ceramic wall; and
    a plurality of modules, each comprising a heat source and at least one metal plate coated with an adherent layer of a ceramic material on one of its principal faces, the at least one metal plate is placed between the refractory ceramic wall and the heat source with a space between the refractory ceramic wall and the at least one metal plate, the adherent layer being situated facing the heat source,
    wherein the ceramic material of the adherent layer reflects infrared more than that of the refractory ceramic wall,
    wherein the at least one metal plate surrounds the heat source except on an open side, and
    wherein a first free space between a first side of the heat source directed toward the refractory ceramic wall and the coated plate extends from 2 mm to 100 mm, and other free spaces between the plate and the heat source on other non-open sides are less than the first free space, or are less than 8 mm.

2. The furnace as claimed in claim 1, wherein a normal to the refractory ceramic wall exists passing through the at least one metal plate and then through the heat source when leaving the refractory ceramic wall.

3. The furnace as claimed in claim 2, wherein the normal then passes through the space.

4. The furnace as claimed in claim 1, wherein the adherent layer is deposited by plasma spray or by electron beam evaporation.

5. The furnace as claimed in claim 1, wherein a free surface of the adherent layer is based on zirconia.

6. The furnace as claimed in claim 1, wherein the at least one metal plate is made of steel or nickel alloy.

7. The furnace as claimed in claim 1, wherein the ceramic material of the adherent layer has a total reflection to infrared greater than 30% between 2 μm and 5 μm.

8. The furnace as claimed in claim 1, wherein a surface of the ceramic material of the adherent layer is based on zirconia or doped zirconia, and further comprising a tie layer between the at least one metal plate and the adherent layer of the ceramic material.

9. The furnace as claimed in claim 1, wherein the heat source comprises an electrical resistance or is a radiant ceramic panel.

10. The furnace as claimed in claim 1, wherein the free space between the first side of the heat source and the coated plate extends from 10 mm to 60 mm.

11. The furnace as claimed in claim 1, wherein the at least one metal plate is coated with the ceramic material on its principal faces.

12. The furnace as claimed in claim 1, wherein the heat sources of the modules comprise electrical resistances supplied independently of each other.

13. The furnace as claimed in claim 1, wherein the at least one metal plates are configured to withstand temperatures between 700° and 1000° C.

14. The furnace as claimed in claim 1, wherein the furnace is configured to heat glass between 500° and 800° C.

15. The furnace as claimed in claim 1, wherein the heat source is configured to reach a temperature between 700° and 1000° C.

16. The furnace as claimed in claim 1, wherein the heat source is a single heat source.

17. A heating device for heating a glass sheet in a space and bending the glass sheet by gravity comprising:
a refractory ceramic wall;
a plurality of modules, each comprising a single heat source and at least one metal plate coated with an adherent layer of a ceramic material on one of its principal faces, the adherent layer being situated facing the single heat source, the at least one metal plate surrounding the single heat source; and
at least one fixing rod connected to the single heat source passing through the at least one metal plate,
wherein the at least one metal plate being in plural parts and being assembled around the fixing rod by at least one orifice, the perimeter of the orifice belonging to different parts of the at least one metal plate, and
wherein the at least one metal plate is placed between the refractory ceramic wall and the single heat source with a space between the refractory ceramic wall and the at least one metal plate.

18. The device as claimed in claim 17, wherein the heat source is electric, that at least two fixing rods are connected to the heat source and pass through the at least one metal plate, and the at least two rods conduct electricity consumed by the heat source.

19. The device as claimed in claim 17, wherein the at least one metal plate surrounds the heat source except on an open side, and
wherein a first free space between a first side of the heat source directed toward the refractory ceramic wall and the coated plate extends from 2 mm to 100 mm, and other free spaces between the plate and the heat source on other non-open sides are less than the first free space, or are less than 8 mm.

20. A method for heating a glass sheet comprising:
heating a furnace,
wherein the furnace comprises:
a refractory ceramic wall; and
a plurality of modules, each comprising a heat source and at least one metal plate coated with an adherent layer of a ceramic material on one of its principal faces, the at least one metal plate is placed between the refractory ceramic wall and the heat source with a space between the refractory ceramic wall and the at least one metal plate, the adherent layer being situated facing the heat source,
wherein the ceramic material of the adherent layer reflects infrared more than that of the refractory ceramic wall,
wherein the at least one metal plate surrounds the heat source except on an open side, and
wherein a first free space between a first side of the heat source directed toward the refractory ceramic wall and the coated plate extends from 2 mm to 100 mm, and other free spaces between the plate and the heat source on other non-open sides are less than the first free space, or are less than 8 mm; and
heating the glass sheet with the heat source from each of the plurality of modules.

21. The method as claimed in claim 20, wherein the glass sheet and the heating ensures gravity bending of the glass sheet placed on a bending frame.

22. The method as claimed in claim 20, wherein the coated metal plate is at a temperature between 700° C. and 1000° C.

23. The method as claimed in claim 20, wherein the heat source is a single heat source.

24. A furnace for heating an object in a space and bending the object by gravity comprising:
a refractory ceramic wall;
a heat source; and
at least one metal plate coated with an adherent layer of a ceramic material on one of its principal faces, the at least one metal plate is placed between the refractory ceramic wall and the heat source with a space between the refractory ceramic wall and the at least one metal plate, the adherent layer being situated facing the heat source,
wherein the ceramic material of the adherent layer reflects infrared more than that of the refractory ceramic wall,
wherein the at least one metal plate surrounds the heat source except on an open side, and
wherein a first free space between a first side of the heat source directed toward the refractory ceramic wall and the coated plate extends from 2 mm to 100 mm and other free spaces between the coated plate and the heat source on other non-open sides are less than the first free space, or are less than 8 mm.

25. The furnace as claimed in claim 24, wherein the first free space between the first side of the heat source directed toward the refractory ceramic wall and the coated plate extends from 10 mm to 60 mm.

26. The furnace as claimed in claim 24, wherein the other free spaces between the coated plate and the heat source on the other non-open sides are less than 8 mm.

27. The furnace as claimed in claim 24, wherein the heat source is a single heat source.

28. A furnace for heating a glass sheet in a space and bending the glass sheet by gravity comprising:

A refractory ceramic wall; and

A plurality of modules, each comprising a single heat source and at least one metal plate coated with an adherent layer of a ceramic material on one of its principal faces, the at least one metal plate is placed between the refractory ceramic wall and the single heat source with a space between the refractory ceramic wall and the at least one metal plate, the adherent layer being situated facing the single heat source, wherein the ceramic material of the adherent layer reflects infrared more than that of the refractory ceramic wall, wherein the at least one metal plate of each of the plurality of modules includes five metal plates that surround the single heat source except on an open side, and the five metal plates include four lateral plates and a bottom plate, and wherein at least one of the lateral plates is coated with the adherent layer of ceramic material on both of its principal faces.

* * * * *